(12) United States Patent
Yamada

(10) Patent No.: US 8,169,632 B2
(45) Date of Patent: May 1, 2012

(54) PRINTING SYSTEM AND PRINTING DEVICE

(75) Inventor: Akihiro Yamada, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 928 days.

(21) Appl. No.: 12/105,426

(22) Filed: Apr. 18, 2008

(65) Prior Publication Data

US 2008/0259394 A1  Oct. 23, 2008

(30) Foreign Application Priority Data

Apr. 19, 2007 (JP) ................. 2007-110625

(51) Int. Cl.
G06K 15/00 (2006.01)
G06F 3/12 (2006.01)
H04N 1/00 (2006.01)

(52) U.S. Cl. .............. 358/1.14; 358/1.15; 358/426.02

(58) Field of Classification Search ............. 358/1.1, 358/1.13–1.18, 1.6, 1.9, 400–408, 425, 434–441, 358/426.02–426.12
See application file for complete search history.

(56) References Cited

U.S. PATENT DOCUMENTS

| | | | |
|---|---|---|---|
| 2006/0181727 A1* | 8/2006 | Numata et al. | 358/1.14 |
| 2007/0206210 A1* | 9/2007 | Miyazaki et al. | 358/1.14 |
| 2007/0223030 A1* | 9/2007 | Miyajima | 358/1.14 |

FOREIGN PATENT DOCUMENTS

| | | | |
|---|---|---|---|
| JP | 11-134128 | | 5/1999 |
| JP | 11-175288 | | 7/1999 |
| JP | 2000-272205 A | | 10/2000 |
| JP | 2000-272205 A | * | 10/2000 |
| JP | 2001-232911 | | 8/2001 |
| JP | 2001-265171 A | | 9/2001 |
| JP | 2002-351634 A | | 12/2002 |
| JP | 2003-248570 A | * | 9/2003 |
| JP | 2003-248570 A | | 9/2003 |
| JP | 2005-190017 | | 7/2005 |
| JP | 2006-229499 A | | 8/2006 |
| JP | 2007-048001 A | | 2/2007 |

OTHER PUBLICATIONS

JP Office Action dtd Jan. 8, 2009, JP Appln. 2007-110625.
JP Office Action dtd Mar. 17, 2009, JP Appln. 2007-110625.

* cited by examiner

*Primary Examiner* — James A Thompson
(74) *Attorney, Agent, or Firm* — Banner & Witcoff, Ltd

(57) ABSTRACT

A printing device is provided with a first storage configured to store a time-designated first print job, a judging unit configured to judge whether to change the print time of the first print job to allow interruption of a second print job which is different from the first print job based on a predetermined condition is met and a printing unit configured to execute a printing operation based on judgment of the judging unit.

11 Claims, 5 Drawing Sheets

PRINTING SYSTEM AND PRINTING DEVICE

CROSS-REFERENCE TO RELATED APPLICATION

This application claims priority under 35 U.S.C. §119 from Japanese Patent Application No. 2007-110625 filed on Apr. 19, 2007. The entire subject matter of the application is incorporated herein by reference.

BACKGROUND

1. Technical Field

The following description relates to a printing device having a time-designating function to execute a printing operation at a designated (programmed) time, and a printing system employing such a printing device.

2. Related Art

Conventionally, a printing device having a time-designating function has been known. Such a printing device is configured such that a printing operation is executed at a designated time, which may be designated at an image processing device (e.g., a personal computer) connected to the printer by a user when a print request is transmitted from the image processing device to the printer. If such a print request (i.e., the execution time being designated) is received before the designated time, the print request is stored in a print queue as a time-designated print job.

An example of such a printer, or an image forming device is disclosed in Japanese Patent Provisional Publication No. 2005-190017 (hereinafter, referred to as '017 publication). The image forming device disclosed in '017 publication is configured such that a print completion time is designated. Therefore, the printer calculates a print start time based on the print completion time and a time period required to execute a printing operation. If a new print job of which the print completion time is not designated is issued before the thus calculated print start time of the time-designated print job, the new print job is allowed to interrupt (i.e., allowed to be inserted in the print queue, before the time-designated print job). While, if the new print data is issued after the print start time of the time-designated print job, the new print job is prevented from interrupting the time-designated print job.

SUMMARY OF THE INVENTION

According to '017 publication, however, all the new print jobs of which the print completion times are not designated may be rejected if the new print jobs are issued after the print start time of the time-designated print job. Such a rejection may be inappropriate in some cases.

In consideration of the above problem, the present invention is advantageous in that the above problem (i.e., rejection of a print job due to existence of another print job) can be well suppressed.

According to aspects of the invention, there is provided a printing system including a printing device and an information processing device which is communicatable with the printing device. The printing system is provided with a first storage configured to store a time-designated first print job, a judging unit configured to judge whether to change the print time of the first print job to allow interruption of a second print job which is different from the first print job based on a predetermined condition is met, and a printing unit configured to execute a printing operation based on judgment of the judging unit.

According to other aspects of the invention, there is provided a printing device which is provided with a first storage configured to store a time-designated first print job, a judging unit configured to judge whether to change the print time of the first print job to allow interruption of a second print job which is different from the first print job based on a predetermined condition is met, and a printing unit configured to execute a printing operation based on judgment of the judging unit.

According to the above configurations, rejection of a print job due to existence of another print job can be well suppressed.

BRIEF DESCRIPTION OF THE ACCOMPANYING DRAWINGS

FIG. 1 is a block diagram showing an electrical configuration of a printing system including a PC (personal computer) and a printer.

FIG. 2 schematically shows a structure of print data.

DETAILED DESCRIPTION

Hereinafter, an embodiment of the present invention will be described with reference to the accompanying drawings.

Figure 1:
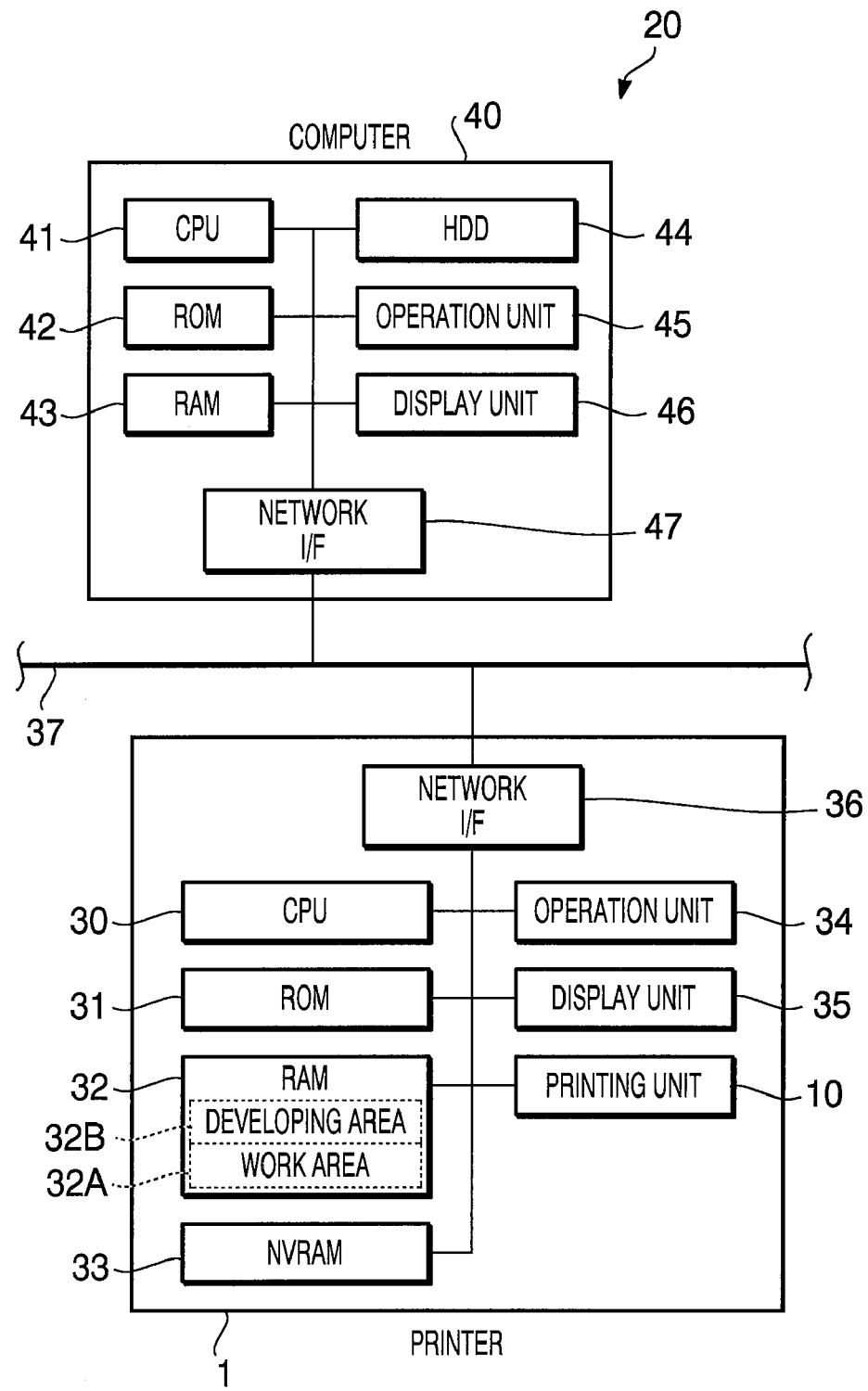

FIG. 1 is a block diagram showing electric configurations of a printing system 20 which includes a printer 1 and a plurality of PCs (Personal Computers) 40 connected to the printer 1 via a communication line 37 (only one of the PCs 40 is shown in FIG. 1 for brevity).

The printer 1 has, as shown in FIG. 1, a CPU (Central Processing Unit) 30, a ROM (Read Only Memory) 31, a RAM (Random Access Memory) 32, an NVRAM (Non-Volatile RAM) 33, an operation unit 34, a display unit 35, a printing unit 10 and a network I/F (interface) 36.

The ROM 31 stores a plurality of programs for controlling the operation of the printer 1 (e.g., a program causing the CPU 30 to execute a printing process described later). The CPU 30 executes each program read out of the ROM 31 and controls the operation of the printer 1 with storing processing results in the RAM 32 and NVRAM 33.

The operation unit 34 is provided with a plurality of buttons, and allows a user to input various commands such as a print request command. The display unit 35 is provided with an LCD (Liquid Crystal Display) and indication lamps, and is capable of displaying various setting windows and the operation statuses of the printer 1. The network I/F 36 is connected to a PC 40 or the like through the communication line 37 so that data communication can be done between the printer 1 and the PC 40 or the like.

The PC 40 is provided with a CPU 41, a ROM 42, a RAM 43, an HDD (Hard Disk Drive) 44, an operation unit 45, an display unit 46 and a network I/F 47. The HDD 44 stores various programs including application software and printer driver for generating data for printing. The operation unit 45 is provided with a keyboard and a pointing device such as a mouse to designate a desired position on the display unit 46.

The display unit 46 is provided with an LCD. The network I/F 47 is connected to the communication line 37.

Figure 2:

FIG. 2 schematically shows a data structure of the print data 100 which is transmitted from the PC 40 to the printer 1. Specifically, when the user of the PC 40 operates the operation unit 45 to input (to issue) a print request command, the printer driver is executed so that the CPU 41 converts data generated by application software for printing to generate PDL (Page Descriptive Language) data or a GDI (Generic Data Interface) data, which is kind of compressed raster data, thereby generating the print data 100 as shown in FIG. 2.

The print data includes, as shown in FIG. 2, a header part 100H and a data part 100D that is an image data part. In the header part 100H, header information is recorded. The header information includes an IP address of the PC 40 from which the print data 100 is output, and an IP address of a destination printer 1, to which the print data 100 is transmitted. Further, the header information includes user information, a print request time (i.e., a time when the print request was issued), a document name, an application name, a data type, the number of pages and the like.

Further, the header information includes designated time information which is referred to when the programmed print function is used. The designated time information is for designating a start time when the printer 1 is controlled to print this print data 100, which will be described in detail later, referring to S42 of FIG. 4. It should be noted that the designated time information may optionally or alternatively represent a completion time at which the printing operation of this print data 100 is completed instead of the start time. The completion time represents a time at which the printer 1 completes the printing operation (e.g., the printer 1 outputs all the recording sheets on which images represented by the print data). When the print data 100 in which the print completion time is designated, the CPU 30 of the printer 1 obtains a time period necessary for completing the print process of the print data 100 based on the data type and the number of pages included in the header information, and determines the print start time, that is, calculates the start time by shifting the print completion time by the time period necessary for executing this printing operation. As above, the print completion time indirectly designates the print start time, and can be considered to be included in the time designating information.

The user of the PC 40 is capable of inputting a desired time as the time designating information described above through the operation unit 45 when the print request regarding the data for printing is made. It should be noted that, for designating the time, the PC 41 may allow the user to input directly designate the time by inputting hours and minutes, or to designate the time by relative hours/minutes with respect to the current time.

At this stage, the user can also set, through the operation unit 45, "permission/inhibition of interruption" and/or "permission/inhibition of deletion." The permission/inhibition of interruption is a setting whether another print job may interrupt the subject print job and be executed preferentially (by priority) such that the print start time of the subject print job is changed and another print job is executed as scheduled if the print start time of the subject print job is close to that of another print job. The permission/inhibition of deletion is a setting whether the subject print job may be deleted if there exists another print job having the same job information as that of the subject print job. The CPU 41 stores an interruption permission flag in the header information if the interruption is permitted, and stores a deletion permission flag in the header information if the deletion is permitted.

Then, the CPU 41 transmits the print data generated as above to the printer 1 through the network I/F 47.

Figure 3:
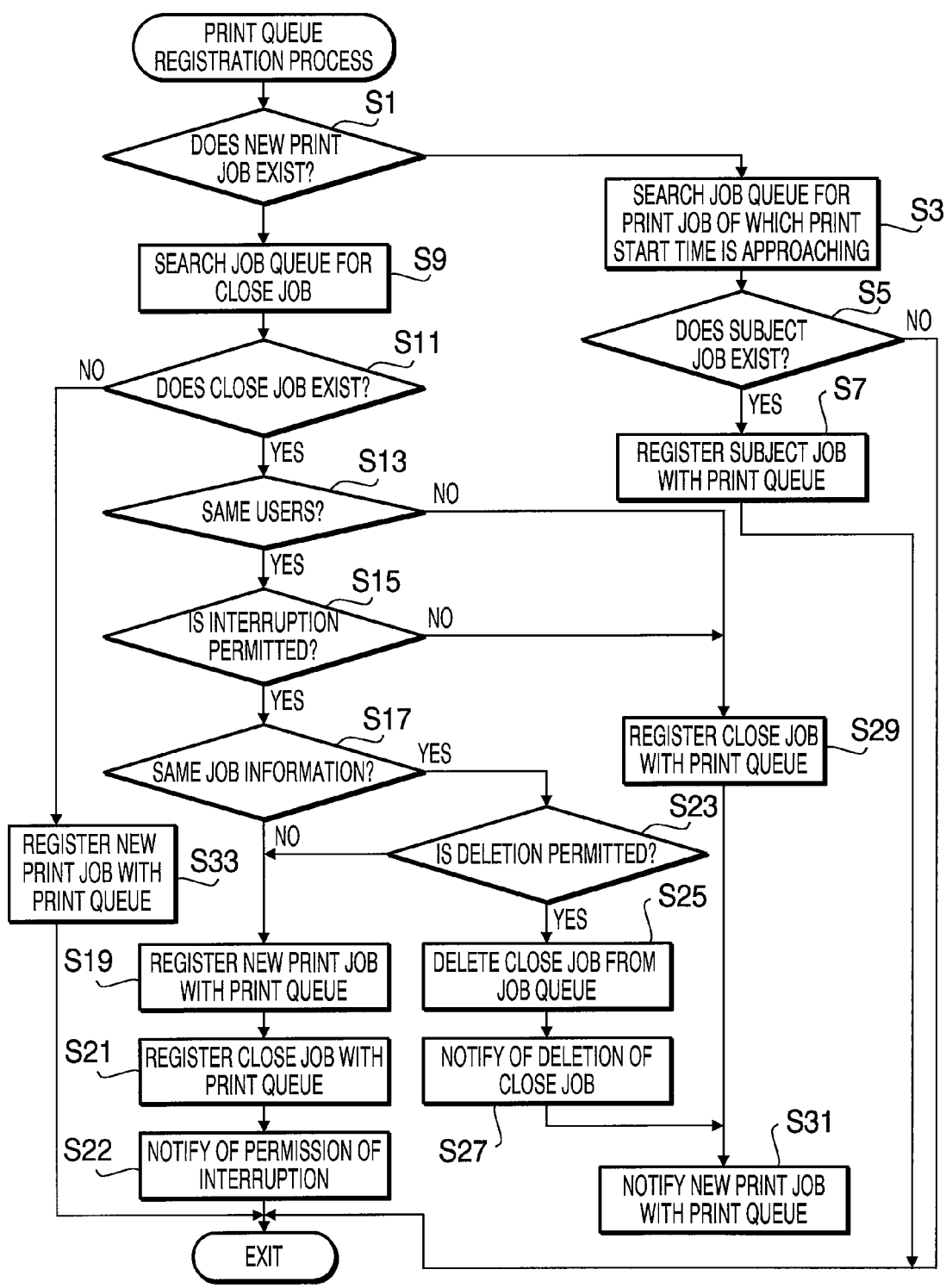
FIG. 3 is a flowchart illustrating a print queue registration process.

FIG. 3 is a flowchart illustrating a print queue registration process executed by the CPU 30 of the printer 1. The print queue registration process is started when the printer 1 is powered on and ready to start the printing operation.

When the print data is received from the PC 40, the CPU 30 executes a developing process. The developing process is for developing the image data of the main part of the print data into bit map data on a developing area 32B defined on the RAM 32 based on the header information of the header part 100H of the print data 100 (see FIG. 2). When the developing process is executed, the CPU 30 generates a new print job having job information based on the header information of the print data on a working area 32A of the RAM 32. According to the exemplary embodiment, it is assumed that the new print job is not a time-designated job (i.e., the print start time is not designated), and thus treated such that the print start time of the new print job is the time when the print job was generated.

In the print queue registration process, in S1, the process periodically checks whether the new print job exists on the working area 32A. If the new print job does not exits (S1: NO), the process searches the "job queue" for a subject job. It is noted that the job queue is defined as a data structure defined on the work area 32A of the RAM 32 for managing time-designated print jobs (i.e., print jobs of which the print start times have been designated), each of which is a time-designated print job and the current time is before the designated time. The subject job is defined as a print job which is one of the print jobs managed with the job queue and the designated time thereof coincides with the current time (i.e., the print start time coincides with the current time of the built-in clock of the printer 1). If the subject job is not included in the job queue (S5: NO), the print queue registration process is terminated. If there is a subject job in the job queue (S5: YES), the process registers the subject job with the print queue (S7), and then the print queue registration process is terminated.

If the new print job exists (S1: YES), the process searches the print job managed by the job queue for a close job (S9). The close job is defined as a print job of which the print start time is close to the print start time of the new print job, and the print start time of the close job should be changed if the new print job is executed at its print start time.

Whether a certain print job is a close job or not can be judged based on the print start time of the new print job and a time period (hereinafter, referred to as a required processing time period) required for completing the new print job, and the print start time and the required processing time period of each print job in the job queue. That is, the process judges that a print job is a close job if a time zone from the print start time to an elapse of the required processing time period of the new print job and another time zone from the print start time to an elapsed of the required processing time period of a print job in the job queue at least partially overlap. Otherwise, the process judges that a print job is not the close job.

It should be noted that the required processing time period can be presumed based on the amount of bitmap data which is related to the print job and developed on the work area 32A and/or page information included in the header information.

If there is no close job in the job queue (S11: NO), the process registers the new print job with the print queue (S33), and the print queue registration process is terminated. If there is a close job (S11: YES), the process judges whether the user of the close job and the user of the new print job are the same (S13). It should be noted that the judgment in S13 can be done based on the user information associated with the new print job (i.e., the user information included in the header information of the print data) and the user information associated with the close job.

If the users of the new print job and the close job are the same (S13: YES), the process judges whether the close job is allowed to interrupt another print job (S15). Whether the interruption is allowed or not can be judged based on presence/absence of interruption permission flag described above. If the interruption permission flag is present (S15: YES), the process judges whether the job information of the close job and the job information of the new print job coincide with each other. Here, the job information represents information which includes at least a file name of the image data of the main data 100D of the print data 100.

If the job information of the close job and the job information of the new print job do not coincide with each other (S17: NO), the process registers the new print job with the print queue firstly, and thereafter registers the close job with the print queue (S19, S21). That is, if the users and job information of the close job and the new print job are the same, and further, if the close job is set to permit the interruption of another job, the print start time of the close job is changed and the printing operation of the new print job is executed preferentially.

In S22, the process notifies that the interruption is permitted (i.e., the print start time of the close job has been changed) to outside, and the process is terminated. The notification is made by, for example, displaying messages on the display unit 35 of the printer and/or the display unit 46 of the PC 40. It should be noted that, for the notification, an audio output device and/or indicating laps provided to the printer 1 may be used alternatively of optionally. With this notification, the user recognizes that the time change of a print job has been made.

When the users are different (S13: NO) or when the interruption is not permitted (S15: NO), the close job is registered firstly with the print queue, the new print job is registered with the print queue thereafter, and the process is terminated (S29, S31). That is, in this case, by changing the print start time of the new print job, and the printing operation of the close job is executed preferentially.

If the job information of the close job and the job information of the new print job coincide with each other (S17: YES), the process judges whether the deletion permitting flag is set in the close job (S23). If the deletion permitting flag is not set (S23: NO), the process proceeds to S19. If the deletion permitting flag is set (S23: YES), the process deletes the close job from the job queue (S25) to eliminate the same from the job queue. Since the close job is deleted from the job queue, the printing unit 10 does not execute the close job.

In S27, the process notifies outside of deletion of the close job. With this configuration, the user recognizes that the printing operation of the close job will not be executed. It should be noted that, for the notification, messages or the like are displayed on the display unit 35 of the printer 1 and/or the display unit 46 of the PC 40. Then, in S31, only the new print job is registered with the print queue.

Figure 4:
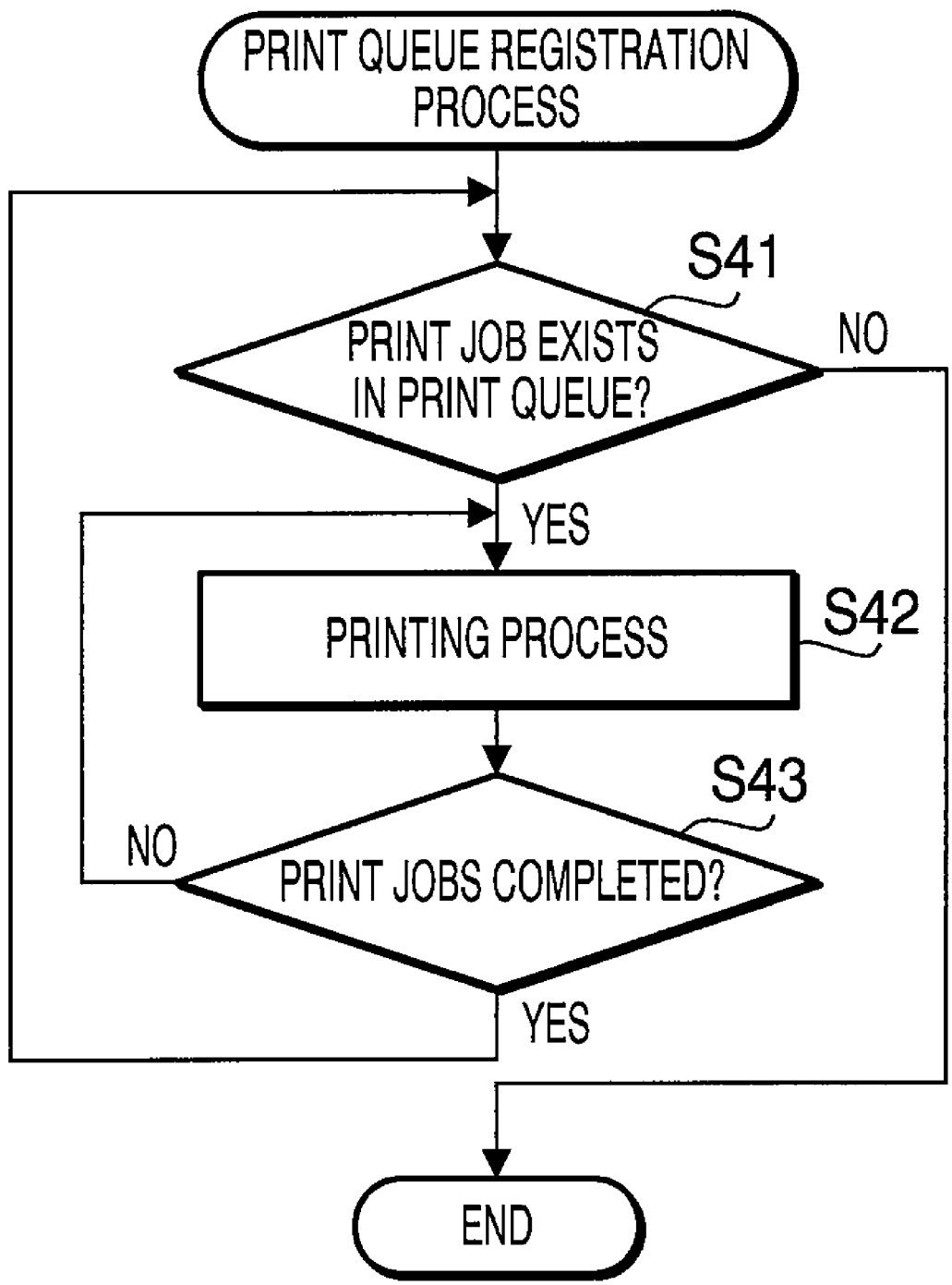
FIG. 4 is a flowchart illustrating a print queue executing process.

The CPU 30 executes, with its multitask processing function, a printing process of the print queue shown in FIG. 4 in parallel with the above-described job queue registration process and print queue registration process.

FIG. 4 is a flowchart illustrating the print queue printing process. The process judges whether there exist print jobs in the print queue (S41). If there exist print jobs in the print queue (S41: YES), the process executes the printing process of the print jobs in the order of registration in the print queue (S42). It should be noted that the "printing process" here is a process to transmit an image signal based on bitmap data (which is developed from the print data) related to the print job to the printing unit 10. With this printing process, the printing unit 10 prints an image on a sheet based on the image signal. If the process judges that the printing process regarding the current print job is finished (S43: YES), the process returns to S41. If the process judges that the printing process regarding the current print job is not finished (S43: NO), the process returns to S42. As above, the printing process (S42) is kept executed. If there are no print jobs in the print queue (S41: NO), the print queue printing process is finished.

Figure 5:
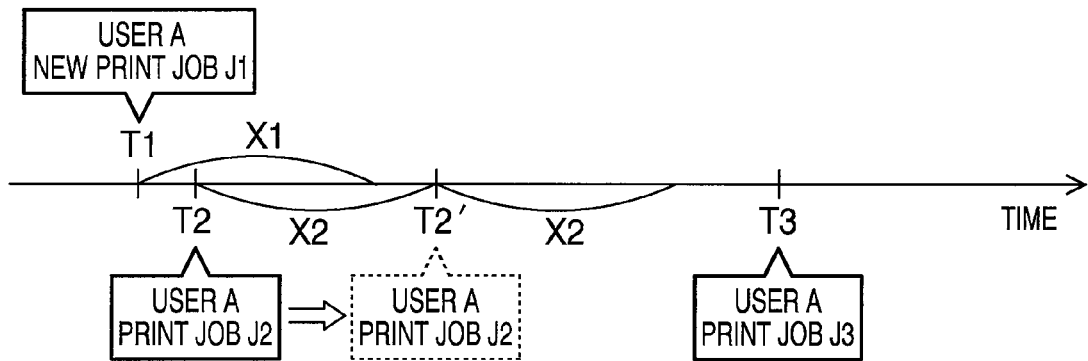
FIG. 5 shows a timing chart illustrating a relationship between print jobs and print job start times, when users coincide with each other.

FIG. 5 shows an example of the job queue. When the print jobs J2, J3, . . . are registered, it is assumed a new print job J1 is generated. According to FIG. 5, the print start time of the print job J2 is T2, which is close to the print start time T1 of the new print job J1. The processing time period of the print job J2 is X2, and the processing time period of the print job J1 is X1. In view of the relationship shown in FIG. 5, the print start time T2 of the print job J2 is within the processing time period of the new print job J1. Therefore, in order to execute the print job J2 on schedule, it is necessary to reject the interruption of the new print job J1.

According to the embodiment, the CPU 30 extracts the print job J2 as the close job (S11: YES). The user of the print job J2 is the same as the user of the new print job J1 (S13: YES). Therefore, if the print job J2 is set such that the interruption of another print job is permitted (S15: YES), and the job information of the print job J2 is different from the job information of the new print job J1 (S17: NO), the new print job J1 is executed on time (i.e., according to the print start time T1). That is, interruption of the new print job J1 is permitted. In such a case, the print job J2 is registered in the print queue after the new print job J1. Therefore, the print job J2 is started at time T2' which is after completion of the new print job J1 (see print job J2 indicated by broken lines).

Figure 6:
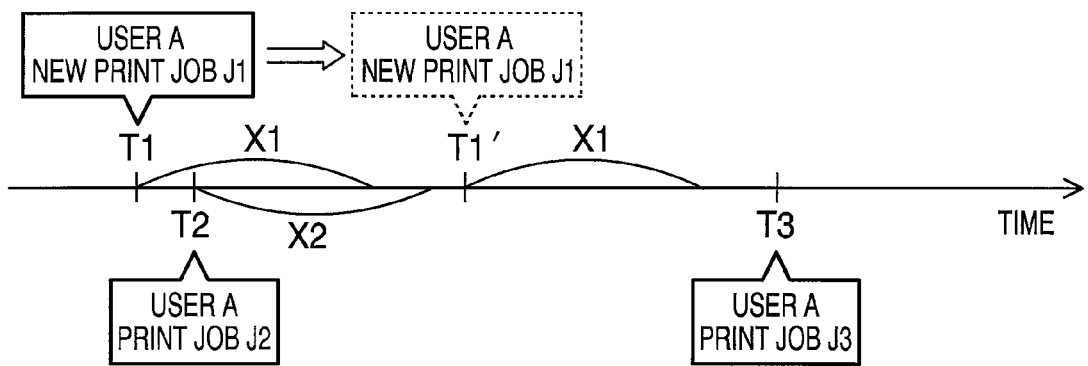
FIG. 6 shows a timing chart illustrating a relationship between print jobs and print job start times, when the users do not coincide.

FIG. 6 shows another example of the print queue. As shown in FIG. 6, if the user of the print job J2 and the user of the new print job J1 are different (S13: NO), or if the print job J2 is set such that the interruption of another job is inhibited (S15: NO), the print job J2 is executed on time (i.e., at time T2 which is originally scheduled). That is, the interruption of the new print job J1 is rejected. In such a case, the new print job J1 is registered in the print queue after the print job J2. Therefore, the new print job is started at time T1' after completion of the print job J2 (see the print job J1 indicated by broken lines).

As above, according to the above-described embodiment, when a predetermined condition is met (i.e., whether the users of two print jobs are the same and the interruption is permitted), the designated time of the close job J2 (or the designated time of the new print job J1) is changed. Therefore, even if the print job J2 is present, rejection of the interruption of the print job J1 is suppressed (i.e., the rejection is not always rejected, but is made depending on the condition).

Further, if the users of the new print job J1 and the print job J2 are the same (S13: YES) and the job information of the new print job J1 and that of the print job J2 coincide with each other (S17: YES), the print job J2 is deleted from the job queue, and the printing operation of the print job J2 will not be executed. Therefore, the print jobs having the same contents will not be executed twice.

It should be noted that the present invention should not be limited to the configuration of the above-described exemplary embodiment, and can be modified in various ways without departing from the scope of the invention. For example, the following modifications may be made.

According to the above-described embodiment, as identification information for identifying the request source, the user information (user ID) is used. This may modified such that the identification number (e.g., IP address) of the PC 40 may be used instead.

According to the above-described embodiment, it is judged whether the user of the new print job and the user of the close job are the same. This may be modified such that it is judged whether the user of the new print job and the user of the close job have a predetermined relationship. For example, if a group of users commonly use the printer 1, the print job of the user in the same group may be regarded as the close job.

According to the above-described embodiment, as the user operates the operation unit 45 of the PC 40 to determine whether interruption of another print job is permitted, and deletion of the print job is permitted. This configuration may be modified such that the determination is made through the operation unit 34 of the printer 1. For example, the names of the time-designated print jobs are displayed on the display unit 35 and the user may determine whether the interruption is permitted/inhibited by operation the operation unit 34.

As the predetermined condition, whether the interruption setting (priority setting) is set may be used. That is, if the interruption setting is made effective, execution of the second print job may have priority and the print start time of the first print job is changed. According to this configuration, demand of the user when the printing is executed is reflected directly. Incidentally, the interruption setting may be made when the user issues the print request through the operation panel 45 of the PC 40.

According to the above embodiment, when the job information of the close job and that of the new print job coincide (S17: YES), the close job is deleted (S25). This may be modified such that the new print job is deleted and the close job is registered with the print queue. Generally, however, the new print job is considered to closely reflect the user's demand, and thus, it is preferable that the new print job is executed preferentially.

According to the above-described embodiment, as a condition for not executing the printing process (i.e., a condition for deleting the print job), the users of the print jobs are the same and the job information of the new print job and the job information of the close job are also the same. This may be modified such that only the job information of the new print job and that of the close print job are compared, regardless of whether the users are the same. Alternatively, the two conditions (i.e., whether the users are the same, and whether the job information is identical) may be selectively used. In such a case, the selection of the conditions may be made manually through the operation unit 45 of the PC 40 and/or the operation unit 34 of the printer 1.

The job information compared in S15 may include various pieces of setting information such as the data amount, print settings and the like as well as the file names. In such a case, the judgment of coincidence can be made precisely.

In the above-described exemplary embodiment, as the second print job, a new print job which does not have a time-designation is referred to. This may be modified such that the second print job may also be a time-designated print job. In such a case, the print queue registration process may be substantially the same as that of FIG. 3. For example, if a time-designated print job is generated as a new print job (S1: YES), the close job is extracted (S11: YES). In this case, however, it should be noted that timings at which the print jobs are registered with the print queue (S19, S21, S29, S31) may be different. That is, the registration is executed at the time when the new print job or the close job is started. It should also be noted that the new print job is once registered with the job queue until it is executed.

According to the above-described embodiment, the print job is a job generated when the print data is received from the PC 40. The invention need not be limited to such a configuration. For example, if the printer 1 (or the image processing device) has a scanning function, and the scanning function can be executed as a time-designated job, the "print job" described above should be interpreted broadly to include such a scanning job.

Further, an external storage detachably connectable to the printer 1 is provided, and the printer 1 is capable of executing a so-called "direct printing" (which is a function of the printer to retrieve the data stored in the connected external storage and prints the retrieved data without a processing executed by the PC 40), and further, the direct printing can be executed as a time-designated job, the direct print job should also be interpreted to be included in the "print job."

Furthermore, the printer 1 need not be limited to the laser printer, but can be any other type of printer such as an inkjet printer. Further, the "printer" need not be a single function printing device but, for example, an MFP (multifunction peripheral) having a facsimile function, printer function and/or scanning function.

In the above-described embodiment, the first print job and the second print job are executed subsequently within a certain period. The invention is not limited to such a case, but a case where the first print job and the second print job may be executed at different timings.

What is claimed is:

1. A printing system including a printing device and an information processing device which is communicable with the printing device, comprising:
    a storage configured to store a time-designated first print job;
    a processor;
    memory storing computer-readable instructions that, when executed, cause the processor to provide a judging unit configured to judge whether to change the print time of the first print job to allow interruption of a second print job different from the first print job based on a predetermined condition being met; and
    a printing unit configured to execute a printing operation based on the judgment of the judging unit,
    wherein the predetermined condition includes an interruption condition related to identification information of a request source of the second print job, the interruption condition being met when a request source of the first print job and the request source of the second print job are the same,
    wherein the memory stores additional computer-readable instructions that, when executed, cause the processor to configure the judging unit to determine whether the request source of the first print job and the request source of the second print job are the same,
    wherein, when the judging unit determines that the request source of the first print job and the request source of the second print job are the same, the printing unit does not execute one of the first print job and the second print job based on the determination of the judging unit.

2. The printing system according to claim 1, wherein the predetermined condition includes a setting that allows the interruption of the second print job.

3. The printing system according to claim 1, wherein the memory stores additional computer-readable instructions that, when executed, further cause the processor to provide a notifying unit configured to notify that the interruption of the second print job is allowed.

4. The printing system according to claim 1, wherein the memory stores additional computer-readable instructions that, when executed, further cause the processor to provide a notifying unit configured to notify that the printing operation is not executed.

5. The printing system according to claim 1, wherein the request source includes user information.

6. The printing system according to claim 1, wherein the request source is the user.

7. A printing device, comprising:
- a storage configured to store a time-designated first print job;
- a processor;
- memory storing computer-readable instructions that, when executed, cause the processor to provide a judging unit configured to judge whether to change the print time of the first print job to allow interruption of a second print job different from the first print job based on a predetermined condition being met; and
- a printing unit configured to execute a printing operation based on the judgment of the judging unit,
- wherein the predetermined condition includes an interruption condition related to identification information of a request source of the second print job, the interruption condition being met when a request source of the first print job and the request source of the second print job are the same,
- wherein the memory stores additional computer-readable instructions that, when executed, cause the processor to configure the judging unit to determine whether the request source of the first print job and the request source of the second print job are the same,
- wherein, when the judging unit determines that the request source of the first print job and the request source of the second print job are the same, the printing unit does not execute one of the first print job and the second print job based on the determination of the judging unit.

8. The printing device according to claim 7, wherein the predetermined condition includes a setting that allows the interruption of the second print job.

9. The printing device according to claim 7, wherein the memory stores additional computer-readable instructions that, when executed, further cause the processor to provide a notifying unit configured to notify that the interruption of the second print job is allowed.

10. The printing device according to claim 7, wherein the request source includes user information.

11. The printing device according to claim 7, wherein the request source is the user.

* * * * *